United States Patent [19]

Payne

[11] Patent Number: 4,457,073

[45] Date of Patent: Jul. 3, 1984

[54] PIPELINE PIG HAVING IMPROVED MEANS OF SENSING CHANGES IN THE INTERNAL CONFIGURATION OF A PIPELINE

[75] Inventor: Larry D. Payne, Owasso, Okla.

[73] Assignee: T. D. Williamson, Inc., Tulsa, Okla.

[21] Appl. No.: 425,433

[22] Filed: Sep. 28, 1982

[51] Int. Cl.³ .................. E21B 47/08; G01B 5/12; G01B 5/20

[52] U.S. Cl. .................. 33/178 F; 73/432 R

[58] Field of Search ............ 33/178 R, 178 E, 178 F, 33/147 K, 1 H; 73/432 R; 267/158, 160, 58, 155

[56] References Cited

U.S. PATENT DOCUMENTS

| | | | |
|---|---|---|---|
| 1,218,409 | 3/1917 | Keeler | 267/58 |
| 2,621,917 | 12/1952 | Landers | 267/155 |
| 2,896,332 | 7/1959 | Elston et al. | 33/178 F |
| 3,755,908 | 9/1973 | Vernooy | 33/178 F |

FOREIGN PATENT DOCUMENTS 2252959  5/1974  Fed. Rep. of Germany ...... 267/155

Primary Examiner—Harry N. Haroian
Attorney, Agent, or Firm—Head, Johnson & Stevenson

[57] ABSTRACT

A pipeline pig having improved means of sensing changes in the internal configuration of the pipeline through which the pig passes is provided by the invention which employs a pipeline pig body, a radial cup of elastomeric material supported to the body having a circumferential edge which engages the interior of the pipeline, a longitudinally positionable stylus shaft supported coaxially of the body and the cup, the inner end of the shaft providing means to actuate an instrumentation recording device, a transfer plate affixed in a radial manner to the outer end of the shaft rearwardly of the cup, and a plurality of spaced apart sensor members, each formed of a metal rod, the inner end of each of the sensor members being affixed to the body and the outer ends being affixed to the transfer plate, the intermediate portion of the sensor members having an integral coil portion which resiliently deflects the outer ends outwardly, the coil engaging the inner circumferential surface of the cup lip portion so that as an indentation in the pipeline deflects the cup inwardly, the intermediate portion of one or more of the sensor members is also inwardly deflected, pivoting the transfer plate which in turn longitudinally displaces the stylus shaft to provide an indication of such pipeline indentation.

6 Claims, 3 Drawing Figures

PIPELINE PIG HAVING IMPROVED MEANS OF SENSING CHANGES IN THE INTERNAL CONFIGURATION OF A PIPELINE

BRIEF SUMMARY OF THE INVENTION

In the pipeline industry it is important that operators know as much as possible about the condition of a pipeline. One means of ascertaining information as to the condition of a pipeline is to run a pipeline pig through it providing a record which is indicative of deviations in the internal configuration of the pipeline wall. For this purpose, pipeline pigs which are generically referred to as caliper pigs are frequently used in industry.

One type of caliper pig which has been successful is exemplified in U.S. Pat. No. 3,755,908 issued Sept. 4, 1973, Burton VerNooy, patentee, entitled: "PIPELINE PIG". This prior issued patent explains in detail the importance of providing an indication of the internal configuration of pipelines and described a type of caliper pig which has been successfully used for making such measurements.

In this prior issued patent, a pipeline pig is provided having a cup of elastomeric material having an outer circumferential lip portion which engages the interior wall of a pipeline through which the pig passes. Supported in the body of the pig is instrumentation means including a recorder for making a record of detected changes in the internal configuration. The illustrated means for recording the information is by means of a chart and a pin which is actuated by an axially positioned rod. The rod extends rearwardly of the pipeline pig and has connected to it a transfer plate which is supported radially of the rod. Pivotally attached to the rearward end of the pipeline pig body are a number of feeler arms. The outer end of each feeler arm engages the interior of the cup circumferential flange or lip portion. Each of the feeler arms is connected by an adjustable length turnbuckle to the transfer plate. Springs urge the transfer plate towards the body, thereby urging the feeler arms outwardly. This system has worked extremely well. It is, however, somewhat expensive to build since it includes pivotal connections of the feeler arms, the turnbuckles and so forth.

The present invention is directed towards a caliper pig as shown in U.S. Pat. No. 3,755,908 but one which employs a different type of sensor means for transmitting the deflection of the periphery of the cup to the stylus shaft. For this purpose the present invention includes a longitudinal pig body having instrumentation means therein such as charts, recorders, and so forth for recording data indicative of the changes in a pipeline interior configuration. A radial elastomeric cup is supported to the body. The cup has a circumferential rearwardly extending flange portion having an inner and outer surface, the outer surface resiliently engaging the internal circumferential surface of the pipeline through which the pig passes. A longitudinally positionable stylus shaft is supported coaxially of the pig body and coaxially of the cup. The inner end of the shaft has means of actuating the instrumentation means within the body so that axial deflection of the stylus shaft produces a recorded indication of the deviations in the pipeline interior configuration.

A transfer plate is affixed in a radial manner to the outer end of the stylus shaft rearwardly of the cup. The important aspect of the invention is the provision of a plurality of spaced apart, uniquely designed sensor members. Each of the sensor members is in the form of an integral small diameter rod having three bends therein with the portions between the bends being stiff. Specifically, each of the sensor member rods has a first bend adjacent the inner end, a second bend adjacent the outer end, and an intermediate bend between the first and second bends. The inner end is secured to the rearward end of the pig body. The outer end of each sensor member engages the transfer plate. The intermediate bend is in engagement with the inner surface of the flange portion of the cup. When the cup deflects inwardly, the intermediate bend of a sensor member in engagement with the portion of the cup being deflected is thereby also deflected inwardly. This moves the transfer plate rearwardly, which movement also causes axial displacement of the stylus rod.

The individual sensor members are relatively inexpensive to construct, are substantially troublefree and long-lasting and do not depend upon pivoted connection to the pig body nor pivotal linkages to connect motion to the transfer plate.

DESCRIPTION OF THE DRAWINGS

FIG. 1 shows the position of the caliper pig wherein the cup member is within a section of pipeline having normal circumferential diameter but just prior to encountering a deviation in the pipeline wall.

In FIGS. 1 and 2 only the upper and lower sensor members are shown to prevent the drawing from becoming obscured by repetitious showing of detail.

DETAILED DESCRIPTION

Figure 1:
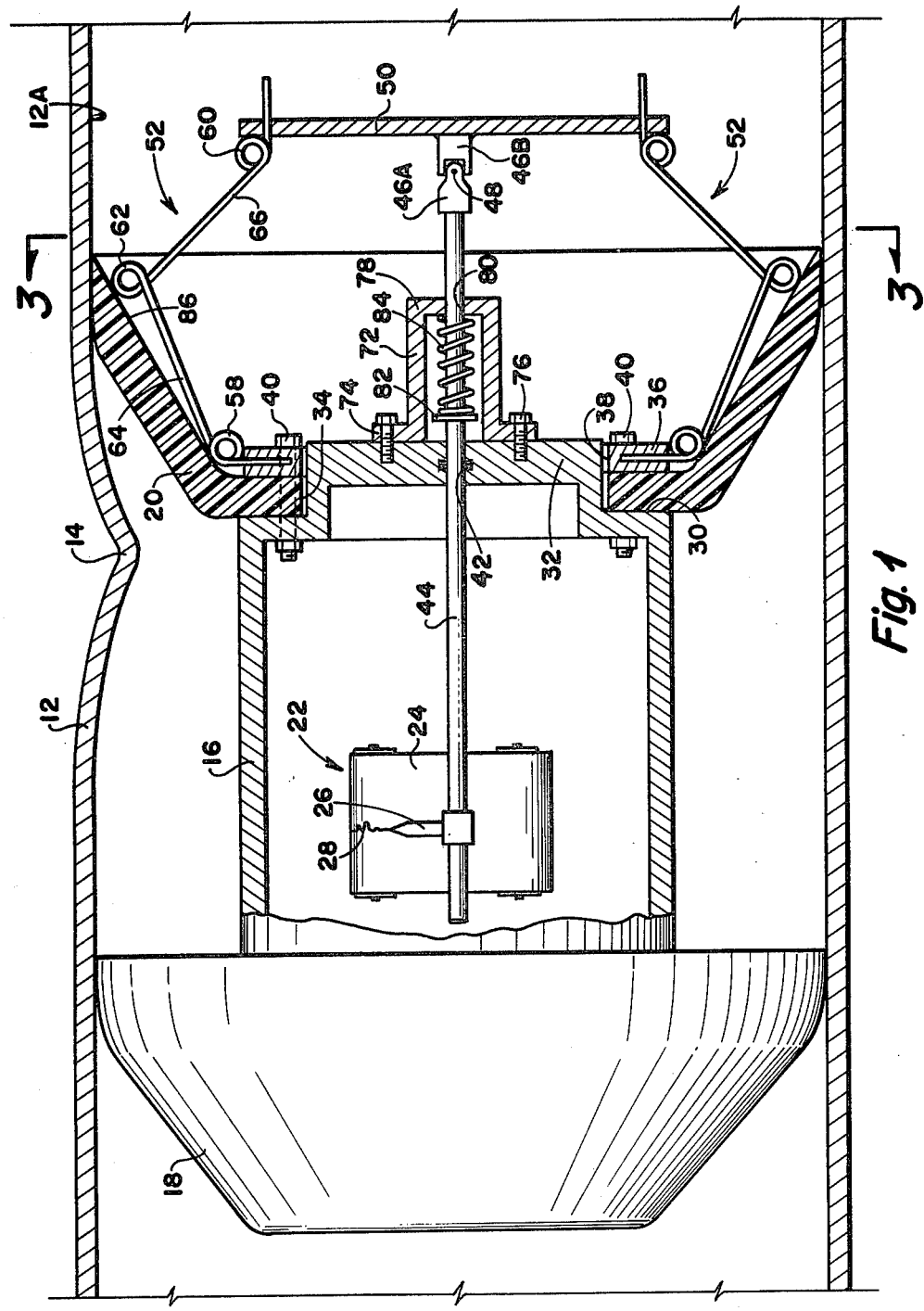
FIG. 1 is an elevational view shown partially in cross-section of a caliper pig within a pipeline and showing the details of construction of the caliper pig and the improved sensor members of the invention.

Referring now to FIG. 1, a caliper pig of the present invention is indicated generally by the numeral 10 and is shown within a pipeline 12, the pipeline having a dent, indicative of a disconformity 14.

The caliper pig 10 includes a body 16 which is longitudinal and is shown to include a forward cup 18 and a rearward cup 20. The illustrations of the body 16, cups 18 and 20 are merely exemplary as the actual appearance of the body 10 may vary considerably, and more than one forward cup 18 may be employed, if desired. Each of the cups 18 and 20 is of an exterior circumferential configuration engaging the interior wall 12A of the pipeline. The cups cause the caliper pig 10 to move through the pipeline 12 by the flow of fluid through it, whether liquid or gas.

Contained within the body 16 is an instrument generally indicated by the numeral 20 for recording disconformities in the pipeline 12. While the instrumentation 20 may vary a great deal in its arrangement and may include electronic means for recording information on magnetic tape, solid state apparatus, or the like, the instrument 22 illustrated herein for purposes of exemplification includes a chart 24 with a marker 26. The function of marker 26 is to provide an indication of the occurrence of disconformities which are reflected by line 28 placed on the chart in response to the position of marker 26. The essence of this invention is the provision of means for actuating the marker 26, which will now be described.

The caliper pig body 16 includes a rearward end portion 30 which has the rearward cup 20 affixed to it. In the illustrated arrangement, the rearward portion 30 includes an integral reduced diameter portion 32. Affixed exteriorly of this reduced diameter portion is the cup 20 having an opening 34 therein which receives the reduced diameter portion 32. A flat, annular retainer plate 36 having opening 38 therein, is also received on the reduced diameter end portion 32 and engages the rearward cup 20. By means of a plurality of bolts 40 the plate 36 holds the rearward cup 20 in position on the rearward end of the caliper pig body.

The body reduced diameter end portion 32 has an axial opening 42 which slidably receives a stylus shaft 44. The inward end of the stylus shaft 44 is attached to marker 26 so that the axial positioning of shaft 44 serves to provide the indicating line 28 on chart 24. The outer end of the stylus shaft 44 receives a universal coupling consisting of portions 46A which is affixed to the end of shaft 44 and portion 46B. The coupling portions 46A and 46B are typical of a universal joint allowing pivotation about an axis 48 as seen in end view in FIGS. 1 and 2 and about an axis which is perpendicular to axis 48, the second axis not being seen.

Affixed to the universal coupling portion 46B is a transfer plate 50 in the form of a flat, circular plate. The universal coupling portion 46B is in the center of one surface, the coupling portion being attached such as by welding.

Figure 2:
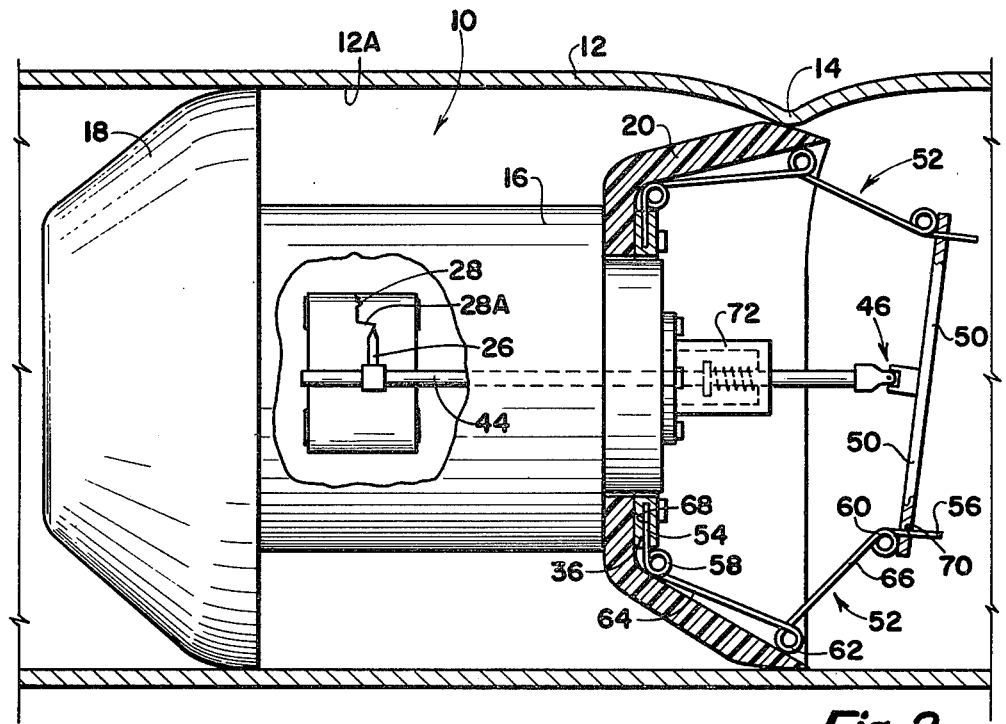
FIG. 2 is an elevational partial cross-sectional view as in FIG. 1, shown at a somewhat smaller scale, and showing the deflection of the cup, sensor member, transfer plate, and stylus shaft as a result of encounter with a disconformity in the pipeline.
Figure 3:
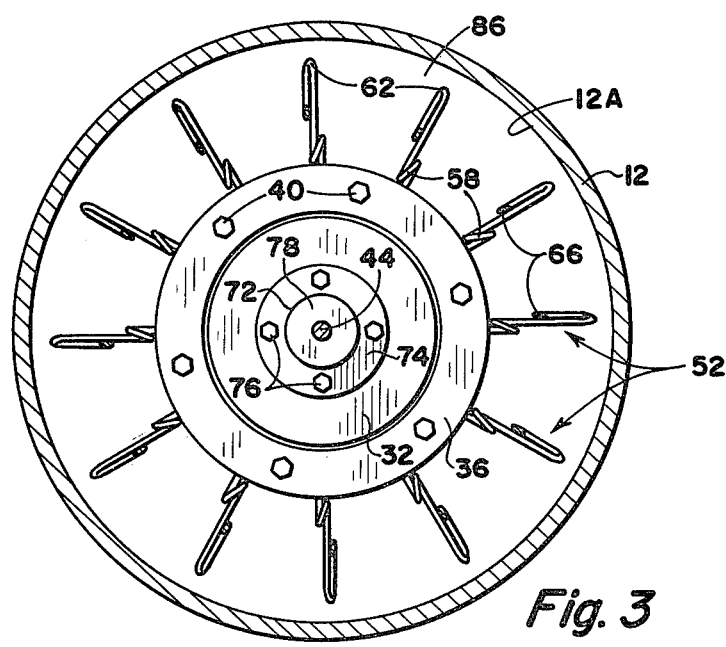
FIG. 3 is a cross-sectional view taken along the line 3—3 of FIG. 1 showing the rearward end of the pipeline pig having the improved sensor members of the present invention.

Extending between the annular retainer plate 36 attached to the caliper pig body rearward end and the transfer plate 50 are a plurality of spaced apart sensor members, each being indicated generally by the numeral 52. In FIGS. 1 and 2, only the topmost and lowermost sensor members are illustrated for purposes of keeping the drawing from being unduly encumbered. However, the sensor members are radially spaced at equal distances around the complete circumference of the retainer plate 36 and transfer plate 50 as illustrated in FIG. 3 which shows 12 such sensor members. The number of sensor members will be determined primarily by the diameter of the pipeline 12 in which the caliper pig is to be employed. The larger the diameter, the more sensor members will be required to accurately reflect disconformities in the pipeline wall. The use of 12 sensors such as illustrated in FIG. 3 is typical of a caliper pig for use in pipelines between twelve inches and twenty-four inches in diameter. For smaller pipelines, fewer are used—in larger pipelines, more will be used; and even in this range, more or less can be employed according to the accuracy of the measurements needed. Each of the sensor members 52 is formed of a unitary, small diameter rod having an inner end portion 54 and an outer end portion 56. Each has a first integral coil 58 adjacent to the inner end portion 54 and an outer end coil 60 adjacent the outer end portion 56. Between the integral coils 58 and 60 is an intermediate integral coil 62. Between the inner end coil 58 and the intermediate coil 62 is a straight portion 64 and, in like manner, between intermediate coils 62 and outer coil 60 is a straight portion 66. Each of the sensor members 52 is formed integrally from a single length of small diameter rod of the spring steel type.

The inner end portion 54 of each sensor member extends in a radial opening 68 in plate 36. The outer portion 56 of each member extends through opening 70 in transfer plate 50, the openings 70 being parallel the perpendicular cylindrical axis of the transfer plate. The outer end coils 60 provides an abutment for transfer plate 50.

Attached to the rearward face of the reduced diameter portion 32 of the caliper pig body is a tubular bracket 72 having an integral flange portion 74 receiving bolts 76. The bracket has an outer closed end 78 having an axial opening 80 therein which slidably receives stylus shaft 44. Within the bracket 72 the stylus shaft has a stop member 82 such as a split washer received in a peripheral groove on the shaft 44, or a pin extending through the shaft 44. Extending between the stop member 82 and the closed end 78 of the bracket is a coiled compression spring 84 which urges the stylus shaft 44 inwardly. This inward bias is resisted by the engagement of the outer coils 60 of the sensor members 52 with the transfer plate 50. The inward force imparted by spring 84 causes the sensor members to deflect so that intermediate coils 62 engage the interior circumferential surface 86 of the rearward cup 20. The normal resiliently of the rearward cup 20 tends to hold it in engagement with the pipeline interior wall 12A, and the force of fluid flow within the pipeline moving the caliper pig through the line also tends to outwardly expand the resilient cup 20. In addition to these two forces, the engagement of the sensor member intermediate coils 62 further ensures engagement of the cup member peripheral surface with the interior of the pipeline.

FIG. 3 shows a rearward cross-sectional view as seen along the line 3—3 of FIG. 1 and shows additional details of various elements of the invention.

When the caliper pig is traveling in a portion of the pipeline which is essentially of uniformly cylindrical configuration, the line 28 made on chart 24 is primarily a straight line with only slight departures when disconformities in the pipeline wall occur. When a major disconformity, such as dent 14, is engaged, as indicated in FIGURE 2, one or more of the sensor members are depressed inwardly by the distortion of cup 20. This action moves the transfer plate 50 rearwardly, as indicated. The movement of the transfer plate is coupled to the stylus shaft 44 and is reflected by sudden and sharp indication 28A on chart 24.

As is pointed out in detail in the prior issued U.S. Pat. No. 3,755,908, the transfer plate 50 functions as an integrator which automatically sums the extent of movements of diametrically opposite sensing means so that when there is a sensed movement of the annular portion in equal amounts but in opposite directions, as when the pig traverses a bend or an L, the output is zero, thereby avoiding a spurious indication of a deviation. When the caliper pig encounters a deviation in one side of the pipeline which causes the caliper pig body to move sideways out of axial alignment with the pipeline, the output of the sensors 52 nearest the dent, such as dent 14, will be less than that indicative of the depth of the dent, but an opposite sensor will then have an output proportional to the sideways movement of the caliper pig. By summing the two as a natural consequence of the movement of the transfer plate 50, the results will be the true indication of the depth of the dent or the minimum diameter of the pipeline at the point of the dent.

The sensor elements 52 are illustrated and described having integral bends 58, 60, and 62. It can be seen that in the illustrated arrangement the bends 58 and 60 are more than 360° while the intermediate bend 62 is slightly less than 360°. It can be seen that the inner coil 58 and outer end coil 60 may be formed of bends of 720° or more, and the intermediate coil 62 may be of more than 360° if desired.

In the preferred embodiment the sensors 52 are formed of spring wire which continually ride against the interior surface 86 of cup 20. This action, in conjunction with spring 84, restrains the actuator plate 50 towards its neutral position.

The invention provides an improved caliper pig following the basic invention of VerNooy U.S. Pat. No. 3,755,908 by simplifying the members which respond to the deflection of the wall-engaging cup to transfer motion to a transfer plate means. Obviously, the arrangement of this invention may be employed in a spherical type cup such as shown in FIG. 5 of U.S. Pat. No. 3,755,908.

While the invention has been described with a certain degree of particularity, it is manifest that many changes may be made in the details of construction and the arrangement of components without departing from the spirit and scope of this disclosure. It is understood that the invention is not limited to the exemplified embodiments set forth herein but is to be limited only by the scope of the attached claim or claims, including the full range of equivalency to which each element thereof is entitled.

What is claimed:

1. A pipeline pig having improved means of sensing changes in the internal configuration of a pipeline through which the pig is passed, comprising:
    a longitudinal body having a forward and rearward end and having instrumentation means therein;
    a radial cup of elastomeric material supported to said body, the cup having a circumferential rearwardly extending flange portion having an inner and outer surface, the outer surface resiliently engaging the internal surface of the pipeline through which the pig passes;
    a longitudinally positionable stylus shaft supported by said body, the inner end thereof having means of actuating said instrumentation means;
    a transfer plate means affixed in a radial manner to the outer end of said stylus shaft rearwardly of said cup; and
    a plurality of spaced apart sensor members each having the inner end thereof affixed to said pig body and having the outer end thereof affixed to said transfer plate, each sensor member being formed of a small diameter rod, each member having a first integral coil adjacent the point of attachment of the inner end to said pig body, having a second integral coil adjacent the point of attachment to said transfer plate, and having a third integral coil intermediate the first and second coils, the third coil being adjacent said cup flange portion inner surface.

2. The pipeline pig according to claim 1 including resilient means urging said stylus shaft and thereby said transfer plate forwardly, the portions of each of said sensor members between said coils being maintained in compression.

3. The pipeline pig according to claim 1 wherein said transfer plate is attached to said stylus shaft by pivotational means.

4. The pipeline pig according to claim 1 including:
    a radial plate member affixed coaxially to said body rearwardly of said cup, the inner end of each of said sensor members being affixed to the plate member.

5. The pipeline pig according to claim 4 wherein said radial plate has a circumferential outer surface and has a recess therein for each said sensor member, the recesses being equally spaced in planes of the body longitudinal axis and of diameter to receive the inner end of said sensor members.

6. For use with a pipeline pig having a body supporting instrumentation for recording the longitudinal displacement of an axially supported rod, and having an elastomeric cup supported to the body, the cup having a circumferential portion resiliently engaging the internal surface of the pipeline through which the pig passes, the circumferential portion deflecting in response to changes in the internal configuration of the pipeline, a plurality of sensor members adapted to respond to deviations in the internal configuration of the pipeline, each of said sensor members comprising a unitary member formed of a small diameter rod having an inner and outer end, the inner end providing means for attachment to a pig body and an outer end providing means for attachment to an instrumentation means, each rod having a first integral coil adjacent the rod inner end and a second integral coil adjacent the outer end, and having a third integral coil intermediate the first and second coils, the intermediate coil being adjacent the cup circumferential portion and thereby displaceable in response to changes in the internal configuration of a pipeline.

* * * * *